Figure 1:
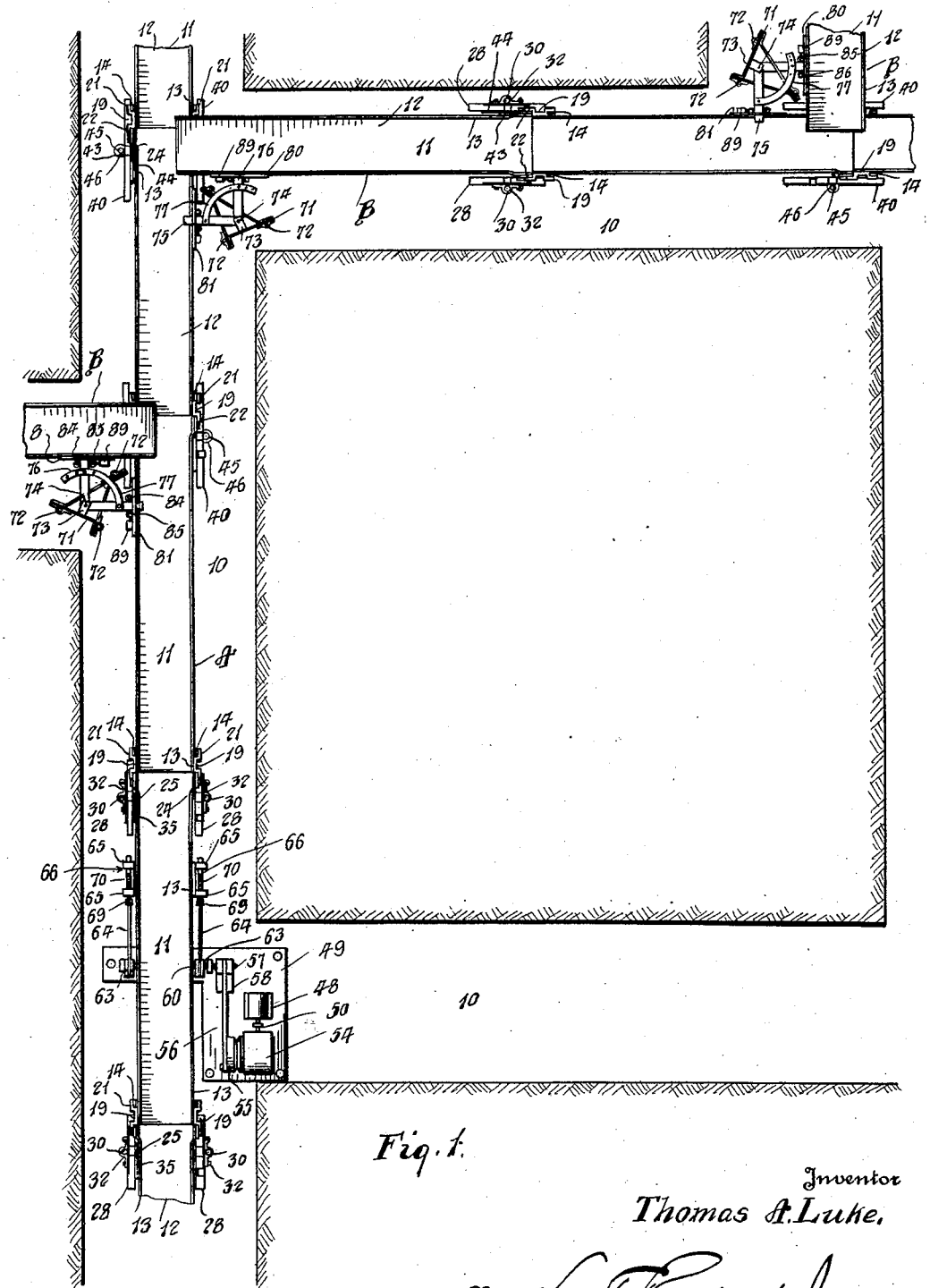

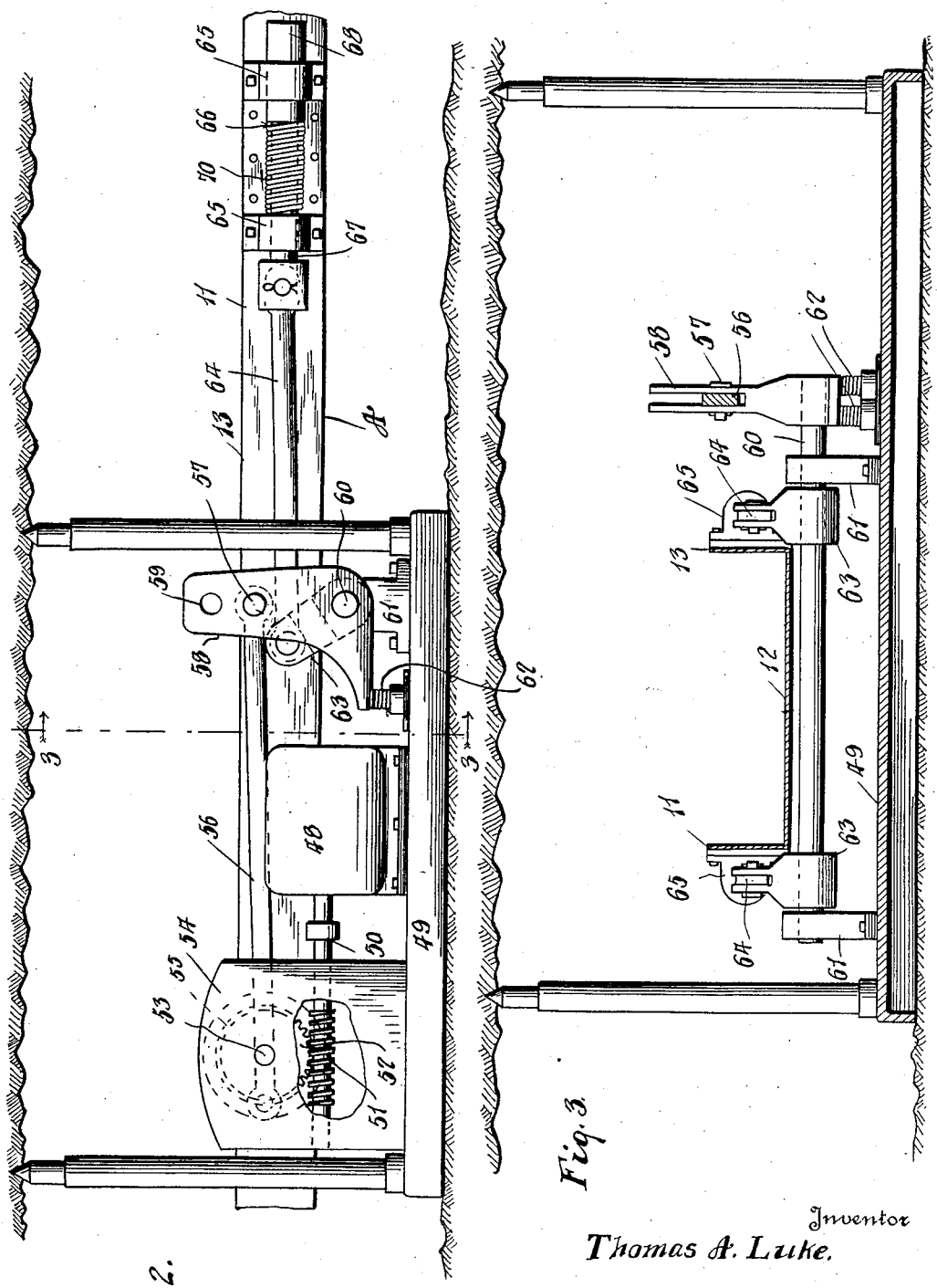

Jan. 31, 1933.    T. A. LUKE    1,895,673
SHAKER CONVEYER
Filed July 2, 1931    5 Sheets-Sheet 3
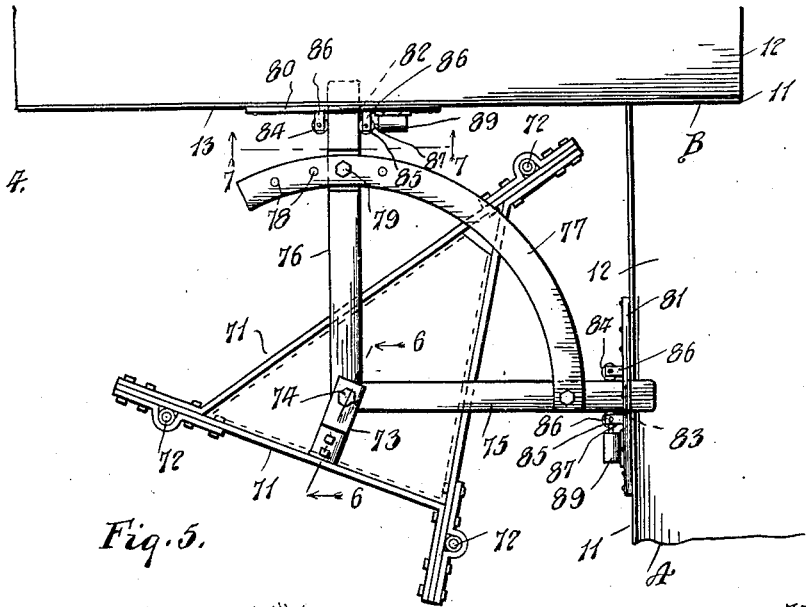
Inventor
Thomas A. Luke.
By L. F. Randolph Jr.
Attorney Jan. 31, 1933.  T. A. LUKE  1,895,673
SHAKER CONVEYER
Filed July 2, 1931  5 Sheets-Sheet 4
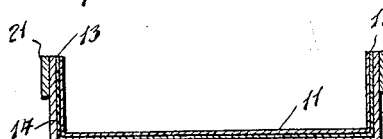
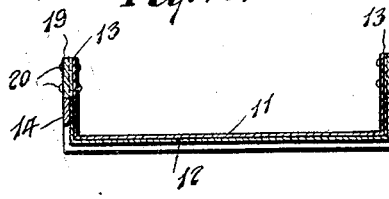
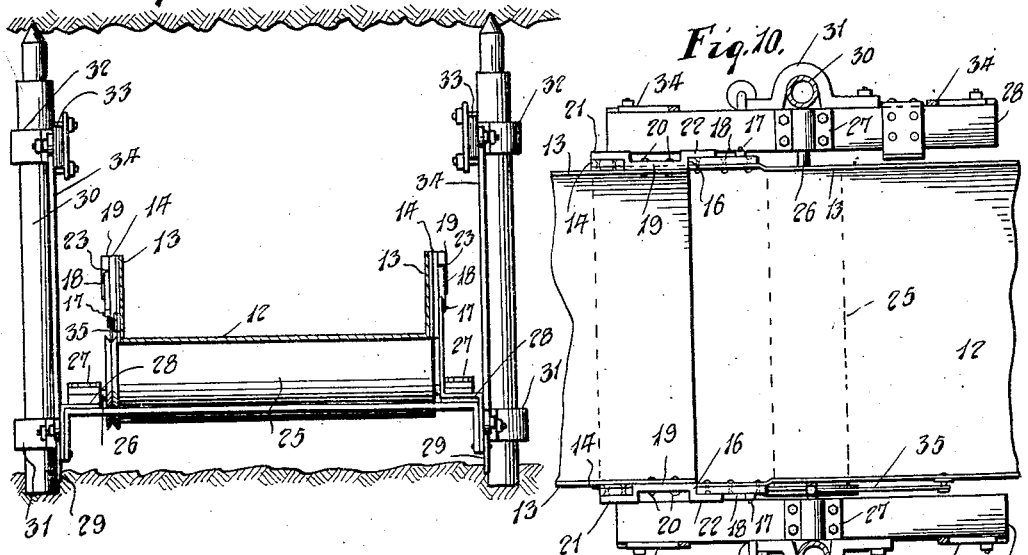
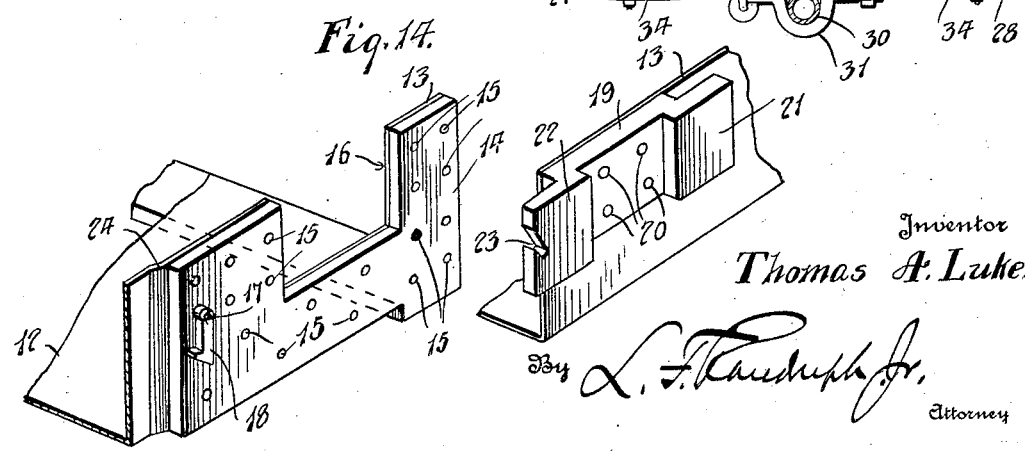
Inventor
Thomas A. Luke.
By L. F. Randolph Jr.
Attorney

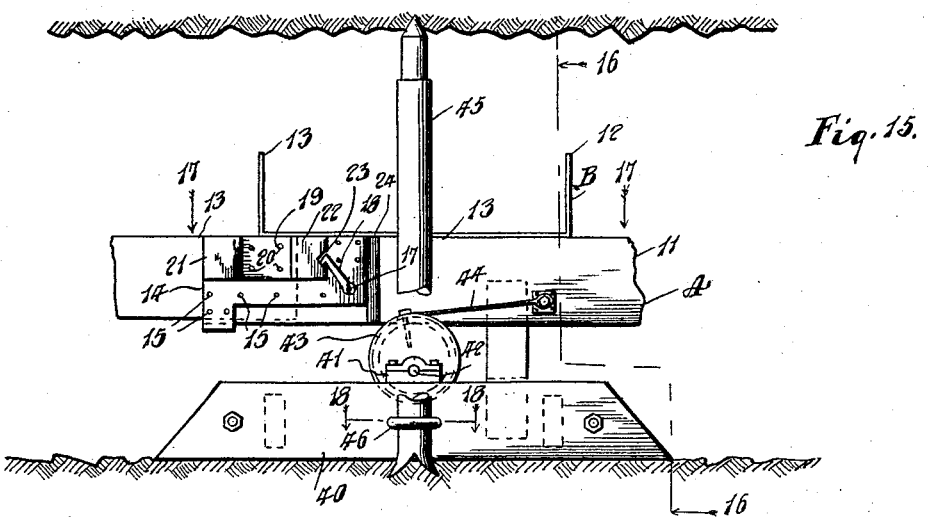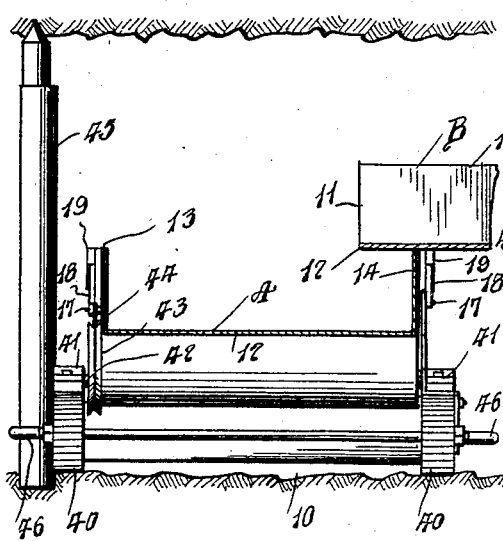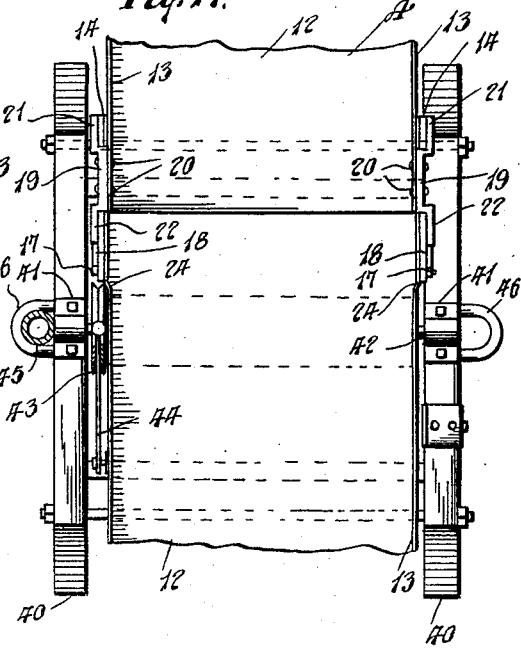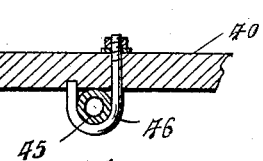

Patented Jan. 31, 1933

1,895,673

UNITED STATES PATENT OFFICE

THOMAS A. LUKE, OF McCOMAS, WEST VIRGINIA, ASSIGNOR OF ONE-HALF TO HOBERT E. LUKE, OF BLUEFIELD, WEST VIRGINIA

SHAKER CONVEYER

Application filed July 2, 1931. Serial No. 548,449.

This invention relates to a shaker or vibratory conveyer adapted for general use but particularly in connection with the conveying of coal or other material from mines, on the surface, or the like.

A particular object is to provide a novel construction and mechanism which is relatively simple and inexpensive, highly efficient and durable and easily operated with minimum skilled labor.

It is particularly aimed to provide a novel means whereby shaker pans or equivalent are supported by novel eccentric roller and cable means so that the same will be supported while moving vertically incidental to shaking operation.

It is also aimed to provide novel means to cause shaking movement of angularly arranged pans from an adjacent pan, to provide novel means whereby the pans will be secured together and novel means whereby motion of the operating parts will be duly cushioned.

Various additional objects and advantages will become apparent from a consideration of the description following taken in connection with accompanying drawings illustrating an operative embodiment.

In said drawings:—

Figure 1 is a horizontal sectional view through a mine, showing my improvements in plan therein, Figure 2 is a detail side elevation on an enlarged scale of the driving mechanism, Figure 3 is a vertical sectional view taken on the line 3—3 of Figure 2, Figure 4 is an enlarged plan view showing the driving connection between angularly arranged pans, Figure 5 is a side elevation of the parts of Figure 4, Figure 6 is a sectional detail taken on the line 6—6 of Figure 4, Figure 7 is a sectional view taken on the line 7—7 of Figure 4, Figure 8 is a sectional view taken on the line 8—8 of Figure 7, Figure 9 is a view showing the eccentric roller mounting for the main pan in side elevation and in connection with adjacent structure, Figure 10 is a horizontal sectional view taken on the line 10—10 of Figure 9, Figure 11 is a vertical sectional view taken on the line 11—11 of Figure 9, Figure 12 is a vertical sectional view taken on the line 12—12 of Figure 9, Figure 13 is a cross sectional view taken on the line 13—13 of Figure 9, Figure 14 is a detail perspective view illustrating the interengaging lock portions of adjacent pans, Figure 15 is a view in elevation showing the eccentric roller mounting means used for the main pan at the junction of a lateral pan therewith, Figure 16 is a sectional view taken on the line 16—16 of Figure 15, Figure 17 is a sectional view taken on the line 17—17 of Figure 15, and Figure 18 is a sectional view taken on the line 18—18 of Figure 15.

Referring specifically to the drawings and first to Figure 1, the invention is shown in connection with tunnels 10 within a coal mine or the like although the device is not to be limited to employment in such relation. A main conveyer is employed as at A into which auxiliary conveyers B are adapted to empty. The conveyers A and B comprise pans 11 of any suitable length, the terminal one of the conveyers B extending over those of the conveyer A so as to empty into the same, (Fig. 16).

The pans 11 are of channel shape in cross section and open at their ends, and suitably reenforced adjacent their ends as at 12 (Figures 12 and 13). Also the side walls 13 of the pans, are provided with U-shaped plates 14, riveted or otherwise secured in place as at 15, and the side walls 13 being cut away or slotted as at 16 to coincide with the plates. Pivoted to the plates 14 as at 17 are latches 18. The other ends of the walls 13 of the pans are provided with fastening plates 19, being riveted thereto as at 20, which have outwardly offset ends or terminals 21 and 22, the latter extending beyond one end of the pans and having a slot 23 therein. As a result, the ends having the plates 19, telescoped into the other ends, which are enlarged as at 24, the main portions of the plates 19 being received in spaces 16 with the portions 21 and 22 overlapping the plates 14 and the latches 18 being applicable in the slot 23. Thus the pans of the conveyers are rigidly but detachably connected together.

In order to support the conveyers for vertical movement incidental to shaking, they rest on drums 25 (Figures 9, 10 and 11). Drums 25 are rigid on shafts 26 journaled in bearings 27 carried by a frame 28 which may have feet 29 engaging the floor of the mine and which is rigidly anchored in place by means of adjustable jacks 30 of any suitable construction, to which the frame 28 is clamped at 31 and 32. The clamps 32 are carried by cross heads 33 joined to the frame by means of rods 34. As will be understood, the upper and lower ends of the jacks, respectively engage the roof and floor of the mine. Flexible wires or the equivalent 35 are fastened to the side walls of adjacent pans 11 and to the drums 25.

At the locations where conveyers empty into each other, the eccentric rollers are mounted differently than in Figures 9 and 10, for instance. To this end, reference is had to Figures 15 to 17. This form has a frame 40 functioning similar to that at 18 and having bearings 41 journaling a shaft 42 to which a drum 43 is eccentrically mounted like the drum 25 is eccentrically mounted. Drum 43 by a flexible wire or other connection 44, fastened thereto and to the adjacent pans, coacts therewith like the flexible elements 35. A single jack 45, identical with those at 30, is used, being secured by means of J-bolts 46 to the frame 40.

The source of power may be an electric or other motor 48 mounted on a platform 49. The driven shaft 50 of said motor has a worm 51 thereon which is in mesh with a worm wheel 52 keyed to a shaft 53 journaled in a gear housing or box 54. Eccentrically pivoted to a disk 55 rigid with the worm wheel 52, is a pitman 56 which is pivoted at 57 to a lever 58. The connection 57 is adjustable since it may be made in any of a series of openings 59. Lever 58 is rigid with a rock shaft 60 which is journaled in bearings 61 supported on the platform 49. The forward end of lever 58 has cushioning springs 62 interposed between the same and the base.

Cranks 63 are rigid with the rock shaft 60 and pitmen 64 are pivoted thereto, one on each side of the adjacent pan 11.

A shock reducing connection is provided between the adjacent pan 11 and the pitmen 64. To this end, bearings 65 are fastened to the sides of the pan and a rod 66 is slidably mounted therein, having portions of different diameters at 67 and 68. The reduced portion 67 is pivotally connected at 69 to the pitmen and expansive coil springs 70 surround the reduced portions and abut adjacent bearings 65.

It will be seen that the operation of the motor 48 will impart a to and fro motion of the conveyer A because of the drive thereof by the pitmen 64 and will also impart an up and down motion thereto because of the cranks 63 and the eccentric drums 25 and 43, such drums moving correspondingly to the pan and maintaining the same parallel with the floor of the mine and the flexible connections causing the eccentric elements to work with the pan or conveyer.

Suitable means is provided whereby the shaking movement of the conveyer A is imparted to the auxiliary conveyers B which mechanism is best detailed in Figures 4 to 8. Adjacent the junction of the discharging pans of the auxiliary conveyers and the conveyer A, a suitable frame is erected as at 71, being of any desired shape and for instance generally triangular as shown in Figure 4. Such frame is clamped to and supported by a plurality of jacks 72 which engage the roof and floor of the mine. Pivotally connected to said frame and a bracket 73 thereon, by means of a bolt 74, is an angle or bell crank lever consisting of arms 75 and 76, pivoted together by the bolts 74 and adjustably secured together by means of an arcuate bar 77 fastened to one of them and adapted to be adjustably bolted by means of openings 78 and a bolt 79 to the other. Plates 80 and 81 are riveted or otherwise fastened as shown to the side walls of the pan of the conveyers A and B, respectively, the same having openings 82 and 83 therethrough through which the arms 75 and 76 pass, such openings being slightly enlarged.

Thus as the conveyer A shakes or vibrates, it correspondingly moves the bell crank lever 75, and causes the same to impart its motion to the conveyers B. In order that the arms of the bell crank lever may move with minimum friction and be cushioned, the same are engaged by rollers 84 and 85. The rollers 84 are journaled in any suitable way at 86 on the plates while the roller 85 is journaled on a rod 86 which is slidable lengthwise of the adjacent conveyer and has engagement with pistons 87, in notches 88. The pistons 87 slide in brackets 89 carried by the plates and against the tension of expansive cushioning springs 90. Thus a shock absorbing cushioning connection is afforded.

It will be realized that through the operation of the motor and driving mechanism, the conveyer A will be shaken or vibrated, causing the material therein to move toward one end thereof for discharge and that through the operation of the bell crank levers 75, as detailed in Figure 4, the auxiliary conveyers B will likewise be shaken or vibrated so that the material which is deposited therein will be moved toward and discharged into the conveyer A to the end that the conveyer A ultimately discharges all of the collected coal or other material.

Various changes may be resorted to provided they fall within the spirit and scope of the invention.

I claim as my invention:—

1. In a conveyer, a trough, means to impart a shaking movement to said trough, a trough disposed for emptying into the first trough, a bell crank lever having extended arms, and the sides of said troughs being provided with openings receiving said extended arms whereby the shaking movement of the first trough will be imparted to the second trough.

2. In a conveyer as in claim 1, cushion means mounted in said troughs and engaging said arms.

3. In a conveyer as in claim 1, rollers mounted in pairs on said troughs and engaging opposite sides of said arms, one of each pair of said rollers mounted for voluntary movement relatively to the other roller of each pair.

4. In a conveyer as in claim 1, rollers mounted in pairs on said troughs and engaging opposite sides of said arms, one of each of said pair of rollers being mounted for movement relatively to the other roller, and spring means associated with said movable roller to hold it in engagement with the arm.

5. In a conveyer as in claim 1, the arms of said levers being pivotally connected for adjustment relatively to one another, and means to secure the arms in relatively adjusted positions.

6. In a conveyer as in claim 1, the arms of said levers being pivotally connected for adjustment relatively to one another, an arcuate member secured to one of said arms and means to secure the other arm to the bar to hold the arms in relatively adjusted positions.

In testimony whereof I affix my signature.

THOMAS A. LUKE.